(12) United States Patent
Song et al.

(10) Patent No.: US 9,153,842 B2
(45) Date of Patent: Oct. 6, 2015

(54) RECHARGEABLE LITHIUM BATTERY INCLUDING POSITIVE ELECTRODE INCLUDING ACTIVATED CARBON AND ELECTROLYTE CONTAINING PROPYLENE CARBONATE

(75) Inventors: Eui-Hwan Song, Yongin-si (KR); Kyeu-Yoon Sheem, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 336 days.

(21) Appl. No.: 13/030,626

(22) Filed: Feb. 18, 2011

(65) Prior Publication Data

US 2011/0206998 A1 Aug. 25, 2011

(30) Foreign Application Priority Data

Feb. 25, 2010 (KR) .................. 10-2010-0017308

(51) Int. Cl.
*H01M 4/62* (2006.01)
*H01M 10/0567* (2010.01)
*H01M 10/0569* (2010.01)
*H01M 10/0568* (2010.01)

(52) U.S. Cl.
CPC ...... *H01M 10/0568* (2013.01); *H01M 10/0569* (2013.01)

(58) Field of Classification Search
CPC ............. H01M 10/0568; H01M 10/0569
USPC .................................. 429/332, 338
See application file for complete search history.

(56) References Cited

U.S. PATENT DOCUMENTS

| 5,639,575 | A | 6/1997 | Omaru et al. |
| 6,541,162 | B1 | 4/2003 | Song et al. |
| 2005/0118512 | A1* | 6/2005 | Onuki et al. ............... 429/326 |
| 2006/0141363 | A1* | 6/2006 | Choi et al. ................. 429/307 |
| 2008/0118836 | A1* | 5/2008 | Hwang et al. ............. 429/219 |
| 2008/0118846 | A1 | 5/2008 | Lee et al. |

FOREIGN PATENT DOCUMENTS

| JP | 63-314766 | 12/1988 |
| JP | 2000182667 A | 6/2000 |
| JP | 2002260634 A * | 9/2002 |
| JP | 2005-209499 | 8/2005 |
| JP | 2005-340026 | 12/2005 |
| JP | 2008-034304 | 2/2008 |
| KR | 1020070103919 | 10/2007 |
| KR | 100814885 | 3/2008 |
| KR | 1020080029479 | 4/2008 |
| KR | 10-2008-0043034 A | 5/2008 |
| KR | 834053 B1 * | 6/2008 |

(Continued)

OTHER PUBLICATIONS

Bang et al., Machine translation of KR KR 834053 B1, Jun. 2008.*

(Continued)

*Primary Examiner* — Sean P Cullen
(74) *Attorney, Agent, or Firm* — Robert E. Bushnell, Esq.

(57) ABSTRACT

A rechargeable lithium battery includes a positive electrode including a positive active material and an activated carbon, a negative electrode including a negative active material, and a lithium salt and a non-aqueous organic solvent, wherein the non-aqueous organic solvent includes about 30 volume % to about 90 volume % of propylene carbonate.

4 Claims, 1 Drawing Sheet

(56) References Cited

FOREIGN PATENT DOCUMENTS

| KR | 10-0845047 B1 | 7/2008 |
| KR | 10-2009-0063446 A | 6/2009 |

OTHER PUBLICATIONS

Tsubouchi et al., Machine translation of JP 2008-034304 A, Feb. 2008.*
Koiwai et al., Machine translation of JP 2002-260634 A, Sep. 2002.*
Tsubouchi et al., Partial human translation of JP 2008-034304 A, Feb. 2008.*
Bang et al., Human translation of KR 834053 B1, Jun. 2008.*
Korean Office Action issued by KIPO on 9 Sep. 2011, in connection with Korean Patent Application No. 10-2010-0017308, and Request for Entry of the Accompanying Office Action attached herewith.
Korean Office Action issued on Apr. 6, 2012 in connection with Korean Patent Application Serial No. 10-2010-0017308 and Request for Entry of the Accompanying Office Action attached herewith.
Korean Office Action issued by Korean Patent Office on Jul. 10, 2014 corresponding to KR 10-2010-0017308 and Request for Entry of the Accompanying Office Action attached herewith.

* cited by examiner

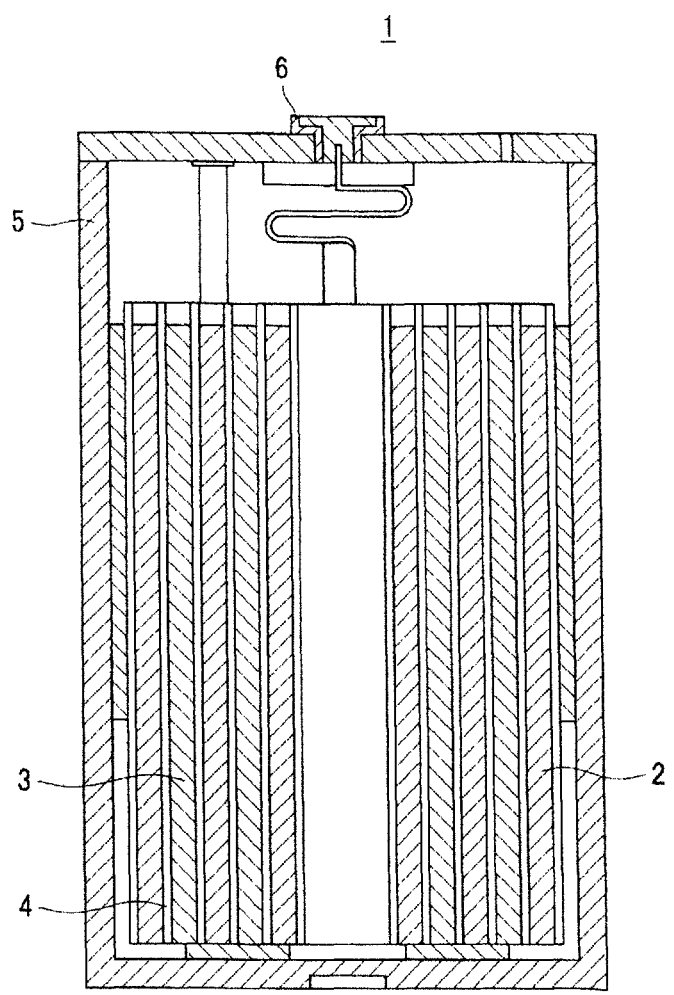

RECHARGEABLE LITHIUM BATTERY INCLUDING POSITIVE ELECTRODE INCLUDING ACTIVATED CARBON AND ELECTROLYTE CONTAINING PROPYLENE CARBONATE

CLAIM OF PRIORITY

This application makes reference to, incorporates the same herein, and claims all benefits accruing under 35 U.S.C. §119 from an application earlier filed in the Korean Intellectual Property Office on Feb. 25, 2010 and there duly assigned Serial No. 10-2010-0017308.

BACKGROUND OF THE INVENTION

1. Field of the Invention

The present invention relates to a rechargeable lithium battery.

2. Description of the Related Art

Lithium rechargeable batteries have recently drawn attention as a power source for small portable electronic devices. They use an organic electrolyte solution and thereby have twice the discharge voltage of a conventional battery using an alkali aqueous solution, and accordingly have high energy density. For positive active materials of a rechargeable lithium battery, lithium-transition element composite oxides being capable of intercalating lithium such as $LiCoO_2$, $LiMn_2O_4$, (0<x<1), and so on have been researched.

The negative active material may include various shapes of carbonaceous materials that are capable of intercalating/deintercalating lithium such as artificial or natural graphite, hard carbon, a metal-based material such as Si, or a lithium composite compound such as lithium vanadium oxide. The electrolyte solution is composed of a lithium salt such as $LiPF_6$ or the like and an organic solvent. The requirements for an organic solvent are low reactivity with lithium; low internal resistance to facilitate the transferrance of lithium ions; thermal stability over a wide temperature range; compatibility with other battery constituent elements of a negative electrode, a positive electrode and the like, in particular, a negative active material; and a high dielectric constant for dissolving a large amount of lithium salt.

Representative examples of an organic solvent include a cyclic carbonate such as ethylene carbonate or the like, dimethyl carbonate, a linear carbonate such as diethyl carbonate or the like, 1,2-dimethoxyethane, diethoxyethane, and mixtures thereof. Recently, research for improving the low temperature characteristics have been conducted. For example, U.S. Pat. No. 5,639,575 discloses an electrolyte solution in which diethyl carbonate having good low temperature characteristics is added to ethylene carbonate/dimethyl carbonate. However, the low temperature characteristics are still not satisfactory.

SUMMARY OF THE INVENTION

One aspect of this disclosure provides a rechargeable lithium battery having excellent low temperature characteristics.

According to one aspect, a rechargeable lithium battery includes a positive electrode including a positive active material and an activated carbon, a negative electrode including a negative active material, and a lithium salt and a non-aqueous organic solvent, wherein the non-aqueous organic solvent includes about 30 volume % to about 90 volume % of propylene carbonate.

The non-aqueous organic solvent may further include an acetate-based ester solvent and a halogenated benzene. The acetate-based ester solvent may be included at about 10 to about 50 parts by volume, and the halogenated benzene at about 5 to about 20 parts by volume based on 100 parts by volume of the entire non-aqueous organic solvent.

The acetate-based ester solvent may be n-propyl acetate, methyl acetate, ethyl acetate, dimethyl acetate, or combinations thereof.

In the rechargeable lithium battery according to one embodiment, the non-aqueous organic solvent may further include a linear carbonate, a halogenated benzene, or combinations thereof.

The linear carbonate may include dimethyl carbonate, ethylmethyl carbonate, diethyl carbonate, dipropyl carbonate, methylpropyl carbonate, ethylpropyl carbonate, methylethyl carbonate, or combinations thereof.

The negative active material may be an amorphous carbon, and a representative example of amorphous carbon may include soft carbon, hard carbon, meso-phase pitch carbide, fired coke, or combinations thereof.

According to another embodiment of the disclosure, a rechargeable lithium battery includes a positive electrode including a positive active material and an active carbon, a negative electrode including a negative active material, and a lithium salt, and a non-aqueous organic solvent, wherein the non-aqueous electrode includes about 30 volume % to about 90 volume % of propylene carbonate, about 10 volume % to about 50 volume % of an acetate-based ester solvent, and about 5 volume % to about 20 volume % of a halogenated benzene.

The rechargeable lithium battery according to one embodiment has excellent low temperature characteristics.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein:

The FIGURE is a diagram of a structure of a rechargeable lithium battery according to one embodiment.

DETAILED DESCRIPTION OF THE INVENTION

Exemplary embodiments will hereinafter be described in detail. However, these embodiments are exemplary, and this disclosure is not limited thereto.

According to one embodiment, provided is a rechargeable lithium battery including a positive electrode including a positive active material and an active carbon, a negative electrode including a negative active material, and a non-aqueous electrolyte including a lithium salt, and a non-aqueous organic solvent.

According to one embodiment, the non-aqueous organic solvent may include about 30 volume % to about 90 volume % of propylene carbonate, and may include an acetate-based ester solvent and a halogenated benzene.

The propylene carbonate is a solvent having a low freezing point, so as to improve the low temperature characteristics of a battery. Accordingly, when the propylene carbonate is included at less than about 30 volume % based on the total amount of non-aqueous organic solvent, it is impossible to provide appropriate low temperature characteristics. In addition, when the propylene carbonate is included at more than about 90 volume %, it may cause problems in high-rate characteristics. Further, when the propylene carbonate is included in excess of about 90 volume %, it may cause problems by relatively increasing the viscosity. An acetate-based ester solvent has excellent fluidity compared to a carbonate-based solvent, has low molecular vibration energy, and has a lower polarity than a carbonate-based solvent, so that it has a low freezing point. Accordingly, when it is used together with propylene carbonate, it may further decrease the freezing point of the non-aqueous organic solvent, so the low temperature characteristics are further improved.

The acetate-based ester solvent may be included at about 10 parts by volume to about 50 parts by volume based on 100 parts by volume of the non-aqueous organic solvent. The acetate-based ester solvent may therefore be included at about 10 volume % to about 50 volume % based on the total amount of the non-aqueous organic solvent. When the acetate-based ester solvent is included within the above range, it may further improve the low temperature characteristics.

The acetate-based ester solvent may be n-propyl acetate, methyl acetate, ethyl acetate, dimethyl acetate, or combinations thereof.

Halogenated benzene is a solvent having low reactivity, a low freezing point, and low viscosity. When a halogenated benzene is used together with a propylene carbonate and an acetate-based ester solvent, it may improve the high-rate characteristics. In other words, when a propylene carbonate and an acetate-based ester solvent are used as a non-aqueous organic solvent, it may prevent the problem that the low temperature characteristic is improved at low rate but the low temperature characteristic is deteriorated at high rate, by using them together with a halogenated benzene. The deterioration of the low temperature characteristics at high rates by using propylene carbonate and the acetate-based ester solvent is caused by the polarity of an acetate-based ester causing it to be well absorbed on the surface of the electrode, even though the polarity is lower than that of a carbonate-based solvent. When the acetate-based ester solvent is absorbed on the surface of the negative electrode, it is not remarkably affected at a low rate, but it requires a high activation energy for solvating a lithium ion solvent of the electrolyte at a high rate, and passing the same though the surface layer of the negative electrode, so as to cause an overpotential. The overpotential accelerates the electrochemical reaction of the absorbed acetate-based ester solvent to cause a partial decomposition reaction of the electrode and to decrease the capacity at a high rate.

The halogenated benzene includes a halogen, so it has higher polarity than an acetate-based ester solvent and thereby it is better adsorbed on the surface of the electrode than an acetate-based ester, but since it has low electrochemical reactivity, it may suppress the partial decomposition reaction of the electrode.

The halogenated benzene is included at about 5 parts by volume to about 20 parts by volume based on 100 parts by volume of the entire non-aqueous organic solvent. The halogenated benzene may therefore be included at about 5 volume % to about 20 volume % based on the total amount of non-aqueous organic solvent. When the halogenated benzene is included within the range, it may further improve the low temperature characteristics at a high rate.

The halogenated benzene includes fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, or combinations thereof. In one embodiment, the halogenated benzene may particularly include fluorobenzene, 1,2-difluorobenzene, 1,3-difluorobenzene, 1,4-difluorobenzene, 2,3-trifluorobenzene, or 1,2,4-trifluorobenzene, or combinations thereof.

In the rechargeable lithium battery according to one embodiment, the non-aqueous organic solvent may further include a linear carbonate, a halogenated benzene, or combinations thereof together with about 30 volume % to about 90 volume % of propylene carbonate.

The linear carbonate includes dimethyl carbonate, ethyl methyl carbonate, diethyl carbonate, dipropyl carbonate, methylpropyl carbonate, ethylpropyl carbonate, methylethyl carbonate, or combinations thereof.

When the non-aqueous organic solvent includes propylene carbonate and further includes a linear carbonate, a halogenated benzene, or a combination thereof, the linear carbonate and the halogenated benzene have low viscosity, and the propylene carbonate has excellent reduction resistance and high low temperature fluidity, so the electrolyte including the same may easily transmit ions at a low temperature. Thereby, it may improve the low temperature characteristics and the low temperature output characteristics.

The linear carbonate, halogenated benzene, or combination thereof may be included at about 70 parts by volume to about 10 parts by volume based on 100 parts by volume of the non-aqueous organic solvent. In addition, when the linear carbonate is used together with the halogenated benzene, they may be mixed at about a 60:40 volume ratio to about a 90:10 volume ratio. When the linear carbonate is mixed with the halogenated benzene, it may reduce the viscosity, so it may improve the transmission of lithium ions while maintaining appropriate viscosity. The effects may be further improved within the range.

The lithium salt supplies lithium ions in the battery, operates a basic operation of a rechargeable lithium battery, and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalato) borate; LiBOB). The lithium salt may be used at about a 0.1 to 2.0M concentration. When the lithium salt is included in the above concentration range, electrolyte performance and lithium ion mobility may be enhanced due to optimal electrolyte conductivity and viscosity.

Regardless of the composition of the non-aqueous organic solvent of the electrolyte, in the rechargeable lithium battery according to one embodiment be an amorphous carbon. Representative examples of amorphous carbon may include soft carbon (low temperature fired carbon), hard carbon, mesophase pitch carbide, fired coke, or combinations thereof.

In addition, the negative electrode includes a negative active material layer including a negative active material and a current collector supporting the same.

In the negative active material layer, the negative active material may be included at about 95 wt % to about 99 wt % based on the total amount of negative active material.

The negative active material layer also includes a binder, and selectively it may further include a conductive material. In the negative active material layer, the binder may be included at about 1 wt % to about 5 wt % based on the total amount of negative active material. In addition, when it further includes a conductive material, it may include about 90 wt % to about 98 wt % of the negative active material, about 1 wt % to about 5 wt % of the binder, and about 1 wt % to about 5 wt % of the conductive material.

The binder improves binding properties of the negative active material particles to each other and to a current collector. The binder includes a non-water-soluble binder, a water-soluble binder, or combinations thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or combinations thereof.

The water-soluble binder includes a styrene-butadiene rubber, an acrylated styrene-butadiene rubber, polyvinyl alcohol, sodium polyacrylate, a copolymer of propylene and C2 to C8 olefin, a copolymer of (meth)acrylic acid and (meth)acrylic acid alkyl ester, or combinations thereof.

When the negative electrode binder includes a water-soluble binder, it may further include a cellulose-based compound for providing viscosity. The cellulose-based compound may include a mixture of at least one of carboxylmethyl cellulose, hydroxypropylmethyl cellulose, methyl cellulose, an alkaline metal salt thereof, or the like. The alkaline metal may include Na, K, or Li. The viscosity-providing compound may be added at about 0.1 to about 3 parts by weight based on 100 parts by weight of the binder.

The conductive material is included to improve electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fiber, and the like; metal-based materials including a metal powder or a metal fiber of copper, nickel, aluminum, silver, and the like; conductive polymers such as polyphenylene derivatives; or mixtures thereof.

The current collector may be selected from a copper foil, a nickel foil, a stainless steel foil, a titanium foil, a nickel foam, a copper foam, a polymer substrate coated with a conductive metal, or combinations thereof.

In the rechargeable lithium battery according to one embodiment, the positive electrode includes a positive active material layer including a positive active material and active carbon, and a current collector supporting the same.

The positive active material and the active carbon may be mixed in a weight ratio of about 99:1 to about 50:50. When the positive active material and the active carbon are mixed in the weight ratio range, the charge and discharge characteristic is further improved, and the electrolyte is well impregnated inside the electrode to facilitate the transmission of lithium ions.

The active carbon may have a specific surface area of about 500 m$^2$/g, and for example, of about 500 m$^2$/g to about 3000 m$^2$/g. In addition, the active carbon may have a shape of powder, granule, fiber, or the like.

The active carbon may be included in the positive active material layer at about 1 wt % to about 50 wt % based on the total amount of the positive active material layer.

The positive active material includes lithiated intercalation compounds that reversibly intercalate and deintercalate lithium ions. The positive active material may include a composite oxide including at least one selected from the group consisting of cobalt, manganese, and nickel, as well as lithium. In particular, the following lithium-containing compounds may be used:

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_c D_\alpha$ (0.90≤a≤1.8, 0≤b≤0.5, 0≤c≤0.5, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above formulas, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The compound may have a coating layer on the surface, or may be mixed with another compound having a coating layer. The coating layer may include at least one coating element compound selected from the group consisting of an oxide of a coating element, a hydroxide, an oxyhydroxide of a coating element, an oxycarbonate of a coating element, and a hydroxyl carbonate of a coating element. The compound for a coating layer may be amorphous or crystalline. The coating element for a coating layer may include Mg, Al, Co, K, Na, Ca, Si, Ti, V, Sn, Ge, Ga, B, As, Zr, or mixtures thereof. The coating layer may be formed by a method having no adverse influence on properties of a positive active material by including these elements in the compound. For example, the method may include any coating method such as spray coating, dipping, and the like. The methods are not illustrated in more detail, since they are well-known to those who work in related fields.

In the positive active material layer, the positive active material may be included at about 50 wt % to about 99 wt % based on the total amount of positive active material layer.

The positive active material layer further includes a binder and a conductive material. The binder may be included at about 1 wt % to about 10 wt % based on the total amount of the positive active material layer, and the conductive material may be included at about 1 wt % to about 5 wt % based on the total amount of the positive active material layer.

The binder improves binding properties of the positive active material particles to one another, and also with a current collector. Examples of the binder include polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include one or more of carbon-based materials such as natural graphite, artificial graphite, carbon black, acetylene black, ketjen black, a carbon fiber, and the like; metal-based materials of a metal powder or a metal fiber including copper, nickel, aluminum, silver, and the like; conductive polymers such as polyphenylene derivatives; or mixtures thereof.

The current collector may be Al, but is not limited thereto.

The FIGURE shows a structure of a rechargeable lithium battery according to one embodiment. As shown in the FIGURE, the rechargeable lithium battery 1 includes a battery case 5 including a positive electrode 3, a negative electrode 2, and a separator 4 interposed between the positive electrode 3 and the negative electrode 2, an electrolyte solution impregnated therein, and a sealing member 6 sealing the battery case 5.

The rechargeable lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following examples illustrate this disclosure in more detail. The following are mere examples of this disclosure and they do not limit the scope and spirit of this disclosure.

EXAMPLE 1

65 wt % of a $LiCoO_2$ positive active material, 20 wt % of activated carbon having a specific surface area of $1500m^2/g$, 5 wt % of a carbon black conductive material, and 10 wt % of a polyvinylidene fluoride binder were mixed in an N-methylpyrrolidone solvent to provide a positive active material slurry. The positive active material slurry was coated on an aluminum current collector, dried, and pressed according to the general process to provide a positive electrode.

85 wt % of a soft carbon negative active material and 15 wt % of a polyvinylidene fluoride binder were mixed in an N-methylpyrrolidone solvent to provide a negative active material slurry. The negative active material slurry was coated on a copper current collector, dried, and pressed according to the general process to provide a negative electrode.

1.1M $LiPF_6$ was dissolved in a solvent in which 60 volume % of propylene carbonate (PC), 10 volume % of fluoro benzene (FB), and 30 volume % of n-propyl acetate (PA) were uniformly mixed to provide a liquid electrolyte.

Using the positive electrode, the negative electrode, and the electrolyte, a pouch full cell (capacity 50 mAh) was fabricated in accordance with the general process.

EXAMPLE 2

1.1M $LiPF_6$ was dissolved in a solvent in which 75 volume % of propylene carbonate (PC), 5 volume % of fluoro benzene (FB), and 20 volume % of n-propyl acetate (PA) were uniformly mixed to provide a liquid electrolyte.

Using the liquid electrolyte and the positive and negative electrodes obtained from Example 1, a pouch full cell (capacity 50 mAh) was fabricated in accordance with the general process.

EXAMPLE 3

1.1M $LiPF_6$ was dissolved in a solvent in which 60 volume % of propylene carbonate (PC), 10 volume % of fluoro benzene (FB), and 30 volume % of methyl acetate (MA) were uniformly mixed to provide a liquid electrolyte.

Using the liquid electrolyte and the positive and negative electrodes obtained from Example 1, a pouch full cell (capacity 50 mAh) was fabricated in accordance with the general process.

EXAMPLE 4

1.1M $LiPF_6$ was dissolved in a solvent in which 75 volume % of propylene carbonate (PC), 5 volume % of fluoro benzene (FB), and 20 volume % of methyl acetate (MA) were uniformly mixed to provide a liquid electrolyte.

Using the liquid electrolyte and the positive and negative electrodes obtained from Example 1, a pouch full cell (capacity 50 mAh) was fabricated in accordance with the general process.

COMPARATIVE EXAMPLE 1

1.1M $LiPF_6$ was dissolved in a solvent in which 60 volume % of propylene carbonate (PC) and 40 volume % of n-propyl acetate (PA) were uniformly mixed to provide a liquid electrolyte.

Using the liquid electrolyte and the positive and negative electrodes obtained from Example 1, a pouch full cell (capacity 50 mAh) was fabricated in accordance with the general process.

COMPARATIVE EXAMPLE 2

1.1M $LiPF_6$ was dissolved in a solvent in which 60 volume % of propylene carbonate (PC) and 40 volume % of methyl acetate (MA) were uniformly mixed to provide a liquid electrolyte.

Using the liquid electrolyte and the positive and negative electrodes obtained from Example 1, a pouch full cell (capacity 50 mAh) was fabricated in accordance with the general process.

COMPARATIVE EXAMPLE 3

1.1M $LiPF_6$ was dissolved in a solvent in which 60 volume % of ethylene carbonate (EC) and 40 volume % of propylene acetate (PA) were uniformly mixed to provide a liquid electrolyte.

Using the liquid electrolyte and the positive and negative electrodes obtained from Example 1, a pouch full cell (capacity 50 mAh) was fabricated in accordance with the general process.

COMPARATIVE EXAMPLE 4

85 wt % of a $LiCoO_2$ positive active material, 5 wt % of a carbon black conductive material, and 10 wt % of a polyvinylidene fluoride binder were mixed in an N-methylpyrrolidone solvent to provide a positive active material slurry. The positive active material slurry was coated on an aluminum current collector, dried, and pressed according to the general process to provide a positive electrode.

85 wt % of a soft carbon negative active material and 15 wt % of a polyvinylidene fluoride binder were mixed in an N-methylpyrrolidone solvent to provide a negative active material slurry. The negative active material slurry was coated on a copper current collector, dried, and pressed according to the general process to provide a negative electrode.

1.1M $LiPF_6$ was dissolved in a solvent in which 60 volume % of propylene carbonate (PC), 10 volume % of fluoro benzene (FB), and 30 volume % of n-propyl acetate (PA) were uniformly mixed to provide a liquid electrolyte.

Using the liquid electrolyte, the positive electrode, and the negative electrode, a pouch full cell (capacity 50 mAh) was fabricated in accordance with the general process.

EXAMPLE 5

65 wt % of a $LiCoO_2$ positive active material, 20 wt % of active carbon having a specific surface area of 1500 m²/g, 5 wt % of a carbon black conductive material, and 10 wt % of a polyvinylidene fluoride binder were mixed in an N-methylpyrrolidone solvent to provide a positive active material slurry. The positive active material slurry was coated on an aluminum current collector, dried, and pressed according to the general process to provide a positive electrode.

85 wt % of a graphite negative active material and 15 wt % of a polyvinylidene fluoride binder were mixed in an N-methylpyrrolidone solvent to provide a negative active material slurry. The negative active material slurry was coated on a copper current collector, dried, and pressed according to the general process to provide a negative electrode.

1.1M $LiPF_6$ was dissolved in a solvent in which 60 volume % of propylene carbonate (PC), 10 volume % of fluoro benzene (FB), and 30 volume % of n-propyl acetate (PA) were uniformly mixed to provide a liquid electrolyte.

Using the liquid electrolyte, the positive electrode, and the negative electrode, a pouch full cell (capacity 50 mAh) was fabricated in accordance with the general process.

Each pouch full cell obtained from Examples 1 to 5 and Comparative Examples 1 to 4 was subjected to the standard charge and discharge that was performed at 0.5 C charge and 0.2 C discharge one time. The standard capacity (%) was determined by dividing the charge capacity by the discharge capacity (charge capacity/discharge capacity), and is shown in the following Table 1.

Each pouch full cell obtained from Examples 1 to 5 and Comparative Examples 1 to 4 was charged and discharged at −20° C. and at 1 C and 20 C, respectively, one time. The charge rate at a low temperature was determined by obtaining % value of 20 C charge capacity to 1 C charge capacity (20 C charge capacity/1 C charge capacity), and is shown in the following Table 1.

Each pouch full cell obtained from Examples 1 to 5 and Comparative Examples 1 to 4 was charged and discharged at 25° C. and 4 C 500 times, and the cycle-life characteristics (%) was determined by the % value of the 500th charge and discharge capacity to the first charge and discharge capacity (500th discharge capacity/first discharge capacity), and is shown in the following Table 1.

TABLE 1

| | Solvent composition of electrolyte (volume %) | | | | | Standard capacity % | Charge rate at low temperature | Cycle life character- |
| --- | --- | --- | --- | --- | --- | --- | --- | --- |
| | EC | PC | FB | MA | PA | (mAh %) | (%) | istics (%) |
| Example 1 | — | 60 | 10 | — | 30 | 95 | 62 | 93 |
| Example 2 | — | 75 | 5 | — | 20 | 93 | 47 | 88 |
| Example 3 | — | 60 | 10 | 30 | — | 92 | 49 | 90 |
| Example 4 | — | 75 | 5 | 20 | — | 94 | 43 | 85 |
| Comparative Example 1 | — | 60 | — | — | 40 | 93 | 55 | 70 |
| Comparative Example 2 | — | 60 | — | 40 | — | 87 | 48 | 65 |
| Comparative Example 3 | 60 | 40 | — | — | — | 80 | 12 | 20 |
| Comparative Example 4 | — | 60 | 10 | — | 30 | 95 | 25 | 40 |
| Example 5 | — | 60 | 10 | — | 30 | 97 | 15 | 85 |

As shown in Table 1, the cells of Examples 1 to 5 had superior standard capacity (%) to those of Comparative Examples 2 and 3.

The cells according to Examples 1 to 4 and Comparative Examples 1 and 2 including a main solvent of propylene carbonate and methyl acetate or n-propyl acetate had an excellent charge rate at low temperature of 40% or more when they were charged and discharged at low temperature of −30° C. and at 20 C.

However, it is understood that the cells according to Examples 1 to 5 had an excellent cycle-life characteristic compared to that of Comparative Example 1 since it further includes fluorobenzene. This resulted from the polarity of fluorobenzene being higher than the polarity of methyl acetate or n-propyl acetate, it was therefore well adsorbed on the surface of the electrode and was electrochemically stable to suppress the decomposition reaction of the electrode.

In addition, since the cell according to Example 5 included a negative active material of graphite, the charge rate at low temperature was deteriorated compared to those according to Examples 1 to 4.

In the case of Comparative Example 4, in which the positive electrode did not include active carbon, the charge rate at a low temperature and the cycle life characteristic at a high temperature were degenerated.

From the results, it is understood that the standard capacity (%), the charge rate at low temperature, and the high-rate cycle life characteristics were all improved by using the positive electrode including activated carbon and the negative electrode including the amorphous carbon negative active material.

COMPARATIVE EXAMPLE 5

1.1M $LiPF_6$ was dissolved in a solvent in which 30 volume % of ethylene carbonate (EC) and 70 volume % of dimethyl carbonate (DMC) were uniformly mixed to provide a liquid electrolyte.

Using the liquid electrolyte and the positive and negative electrodes obtained from Example 1, a pouch full cell (capacity 50 mAh) was fabricated in accordance with the general process.

COMPARATIVE EXAMPLE 6

1.1M $LiPF_6$ was dissolved in a solvent in which 50 volume % of ethylene carbonate (EC) and 50 volume % of dimethyl carbonate (DMC) were uniformly mixed to provide a liquid electrolyte.

Using the liquid electrolyte and the positive and negative electrodes obtained from Example 1, a pouch full cell (capacity 50 mAh) was fabricated in accordance with the general process.

EXAMPLE 6

1.1M $LiPF_6$ was dissolved in a solvent in which 30 volume % of propylene carbonate (PC) and 70 volume % of dimethyl carbonate (DMC) were uniformly mixed to provide a liquid electrolyte.

Using the liquid electrolyte and the positive and negative electrodes obtained from Example 1, a pouch full cell (capacity 50 mAh) was fabricated in accordance with the general process.

EXAMPLE 7

1.1M $LiPF_6$ was dissolved in a solvent in which 50 volume % of propylene carbonate (PC) and 50 volume % of dimethyl carbonate (DMC) were uniformly mixed to provide a liquid electrolyte.

Using the liquid electrolyte and the positive and negative electrodes obtained from Example 1, a pouch full cell (capacity 50 mAh) was fabricated in accordance with the general process.

EXAMPLE 8

1.1M $LiPF_6$ was dissolved in a solvent in which 50 volume % of propylene carbonate (PC) and 50 volume % of ethylmethyl carbonate (EMC) were uniformly mixed to provide a liquid electrolyte.

Using the liquid electrolyte and the positive and negative electrodes obtained from Example 1, a pouch full cell (capacity 50 mAh) was fabricated in accordance with the general process.

EXAMPLE 9

1.1M $LiPF_6$ was dissolved in a solvent in which 40 volume % of propylene carbonate (PC), 30 volume % of ethylmethyl carbonate, and 30 volume % of fluorobenzene were uniformly mixed to provide a liquid electrolyte.

Using the liquid electrolyte and the positive and negative electrodes obtained from Example 1, a pouch full cell (capacity 50 mAh) was fabricated in accordance with the general process.

EXAMPLE 10

1.1M $LiPF_6$ was dissolved in a solvent in which 80 volume % of propylene carbonate (PC) and 20 volume % of ethylmethyl carbonate were uniformly mixed to provide a liquid electrolyte.

Using the liquid electrolyte and the positive and negative electrodes obtained from Example 1, a pouch full cell (capacity 50 mAh) was fabricated in accordance with the general process.

COMPARATIVE EXAMPLE 7

1.1M $LiPF_6$ was dissolved in a solvent in which 20 volume % of propylene carbonate (PC) and 80 volume % of ethylmethyl carbonate were uniformly mixed to provide a liquid electrolyte.

Using the liquid electrolyte and the positive and negative electrodes obtained from Example 1, a pouch full cell (capacity 50 mAh) was fabricated in accordance with the general process.

COMPARATIVE EXAMPLE 8

1.1M $LiPF_6$ was dissolved in a solvent in which 10 volume % of propylene carbonate (PC), 40 volume % of dimethyl carbonate, 30 volume % of ethylmethyl carbonate, and 20 volume % of fluorobenzene were uniformly mixed to provide a liquid electrolyte.

Using the liquid electrolyte and the positive and negative electrodes obtained from Example 1, a pouch full cell (capacity 50 mAh) was fabricated in accordance with the general process.

COMPARATIVE EXAMPLE 9

1.1M $LiPF_6$ was dissolved in a solvent in which 20 volume % of propylene carbonate (PC), 30 volume % of dimethyl carbonate, 40 volume % of ethylmethyl carbonate, and 10 volume % of fluorobenzene were uniformly mixed to provide a liquid electrolyte.

Using the liquid electrolyte and the positive and negative electrodes obtained from Example 1, a pouch full cell (capacity 50 mAh) was fabricated in accordance with the general process.

Each pouch full cell obtained from Examples 6 to 10 and Comparative Examples 5 to 9 were charged and discharged at 0.2 C one time. The initial charge and discharge efficiency (%) was determined by dividing the charge capacity by the discharge capacity (charge capacity/discharge capacity), and is shown in the following Table 2.

Each pouch full cell obtained from Examples 6 to 10 and Comparative Examples 5 to 9 was charged and discharged at −20° C. and at 1 C and 20 C one time. The charge rate at low temperature (%) was determined by dividing the 20 C charge capacity by the 1 C charge capacity (20 C charge capacity/1 C charge capacity), and is shown in the following Table 2.

Each pouch full cell obtained from Examples 6 to 10 and Comparative Examples 5 to 9 was charged and discharged at −30° C. and at 1 C and 20 C one time. The discharge rate at low temperature (%) was determined by dividing the 20 C discharge capacity by the 1 C discharge capacity (20 C discharge capacity/1 C discharge capacity), and is shown in the following Table 2.

TABLE 2

| | Solvent composition of electrolyte (volume %) | | | | | Initial charge/discharge efficiency (%) | Charge rate at low temperature (%) | Discharge rate at low temperature (%) |
|---|---|---|---|---|---|---|---|---|
| | EC | PC | DMC | EMC | FB | | | |
| Example 6 | — | 30 | 70 | — | — | 95 | 20 | 29 |
| Example 7 | — | 50 | 50 | — | — | 93 | 29 | 37 |
| Example 8 | — | 50 | — | 50 | — | 92 | 30 | 43 |
| Example 9 | — | 40 | — | 30 | 30 | 94 | 25 | 33 |
| Example 10 | — | 80 | — | 20 | — | 90 | 40 | 55 |
| Comparative Example 7 | | 20 | 80 | | | 92 | 15 | 25 |
| Comparative Example 8 | | 10 | 40 | 30 | 20 | 89 | 10 | 22 |
| Comparative Example 9 | | 20 | 30 | 40 | 10 | 93 | 9 | 27 |
| Comparative Example 5 | 30 | — | 70 | — | — | 93 | 3 | 6 |
| Comparative Example 6 | 50 | — | 50 | — | — | 87 | 1 | 3 |

As shown in Table 2, the cells obtained from Examples 6 to 10 had similar initial charge and discharge efficiency to the cells obtained from Comparative Examples 5 and 9, but remarkably different charge rates at low temperature and discharge rates at low temperature from those of Comparative Examples 5 and 9. Particularly, the cells obtained from Comparative Examples 5 and 6 including ethylene carbonate had almost no capacity under severe conditions such as −20° C. In addition, in the case of Comparative Examples 7 to 9 including 9 to 15 volume % of propylene carbonate, the charge rate at low temperature was extremely deteriorated.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended to claims.

What is claimed is:

1. A rechargeable lithium battery, comprising:
   a positive electrode comprising a positive active material and activated carbon;
   a negative electrode comprising a negative active material;
   a lithium salt and a non-aqueous organic solvent, wherein the non-aqueous organic solvent comprises about 30 volume % to about 80 volume % of propylene carbonate;
   the non-aqueous organic solvent further comprises an acetate-based ester solvent and a halogenated benzene wherein the acetate-based ester solvent is present at about 10 parts by volume to about 50 parts by volume, and the halogenated benzene is present at about 5 parts by volume to about 20 parts by volume, based on 100 parts by volume of the non-aqueous organic solvent; and
   wherein the negative active material comprises an amorphous carbon comprising soft carbon, hard carbon, mesophase pitch carbide, fired coke, or combinations thereof.

2. The rechargeable lithium battery of claim 1, wherein the acetate-based ester solvent comprises n-propyl acetate, methyl acetate, ethyl acetate, or dimethyl acetate, or combinations thereof.

3. The rechargeable lithium battery of claim 1, wherein the non-aqueous organic solvent further comprises a linear carbonate.

4. The rechargeable lithium battery of claim 3, wherein the linear carbonate comprises dimethyl carbonate, ethylmethyl carbonate, diethyl carbonate, dipropyl carbonate, methylpropyl carbonate, ethylpropyl carbonate, methylethyl carbonate, or combinations thereof.

* * * * *